Mar. 20, 1923.

R. L. RICE, Sr., ET AL.
HEADLIGHT.
FILED MAR. 23, 1922.

WITNESSES
W. A. Williams
W. F. Buckley

INVENTORS
R. L. Rice, Sr.
and W. M. Jordan, Jr.
BY
Munn & Co.
ATTORNEYS

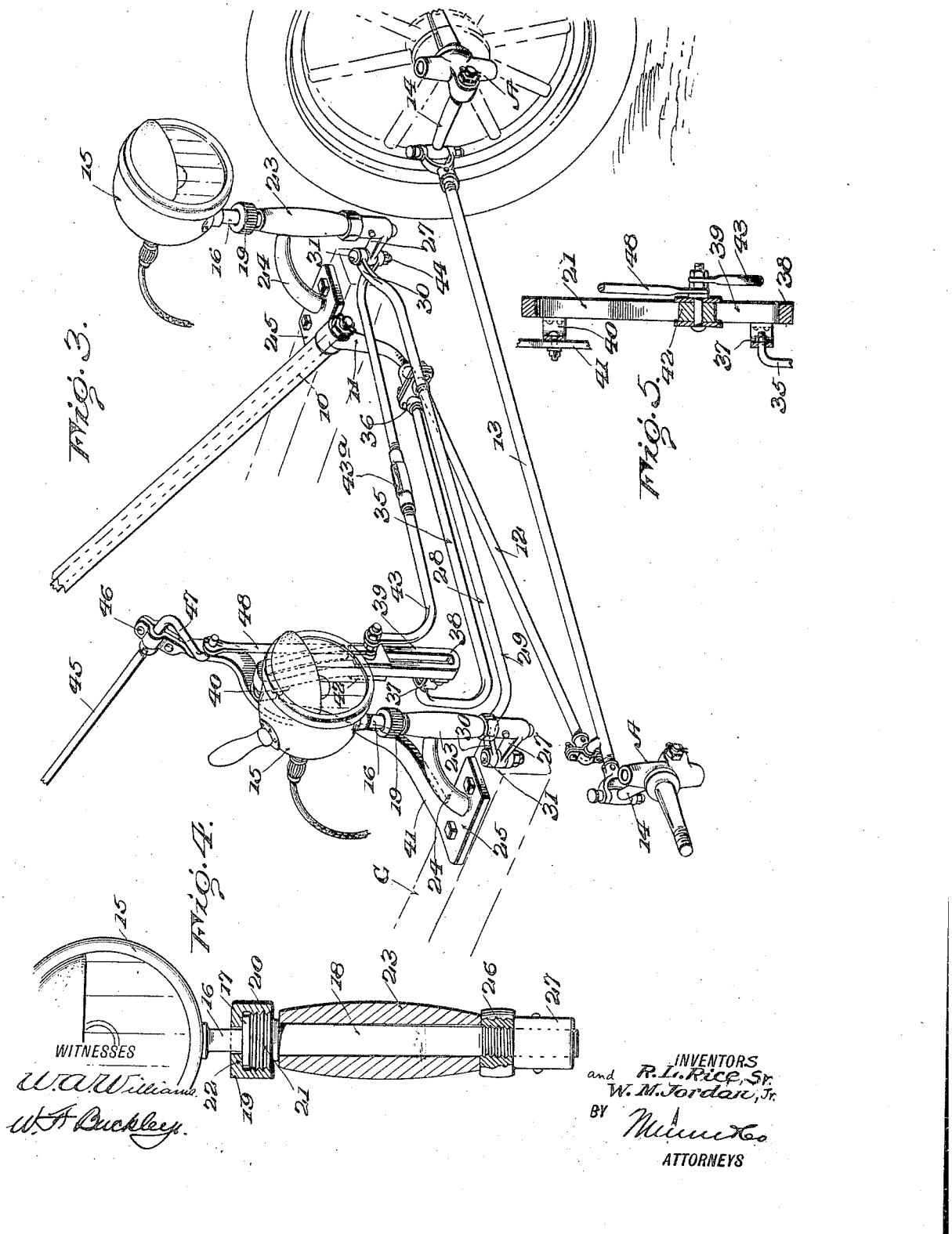

Patented Mar. 20, 1923.

1,448,867

UNITED STATES PATENT OFFICE.

ROBERT LAWRENCE RICE, SR., AND WILLIAM MARTIN JORDAN, JR., OF HOVEY, MISSISSIPPI.

HEADLIGHT.

Application filed March 23, 1922. Serial No. 545,955.

*To all whom it may concern:*

Be it known that we, ROBERT L. RICE, Sr., and WILLIAM M. JORDAN, Jr., citizens of the United States, and residents of Hovey, in the county of Harrison and State of Mississippi, have invented certain new and useful Improvements in Headlights, of which the following is a specification.

This invention relates to an improvement in headlights utilized on automobiles or similar motor vehicles, and has for its object to provide an improvement of this character wherein the headlights are controlled by the steering mechanism of the vehicle in such manner that they are constrained to turn with the steering wheels of the vehicle whereby the roadway is properly illuminated even on the sharpest turns.

Another object is to provide an improvement of this character wherein the control of the steering mechanism over the headlights may be varied at the will of the operator or may be entirely dispensed with so that the headlights will remain stationary and will not partake of a movement corresponding to the movement of the steering wheels, this being especially desirable in day-time, in order to save wear on the mechanism constituting the invention.

Another object is to provide a device of this character embodying a portable headlight which may be utilized as a spot light at night, enabling the driver to immediately carry out adjustments and repairs.

Another object is to provide a device of this character which is of simple and durable construction, reliable in operation and comparatively easy and inexpensive to manufacture and apply upon a motor vehicle.

With these and other objects in view, the invention consists of certain novel features of construction, combination and arrangement of parts which will be hereinafter more fully described and particularly pointed out in the appended claim, reference being had to the accompanying drawings forming part of this specification, and in which:

Figure 3 is a fragmentary view in perspective;

Figure 4 is a detail view, partly in elevation and partly in section, illustrating the mounting or support of the headlight; and Figure 5 is a detail view in vertical section of the link mechanism.

Figure 1:
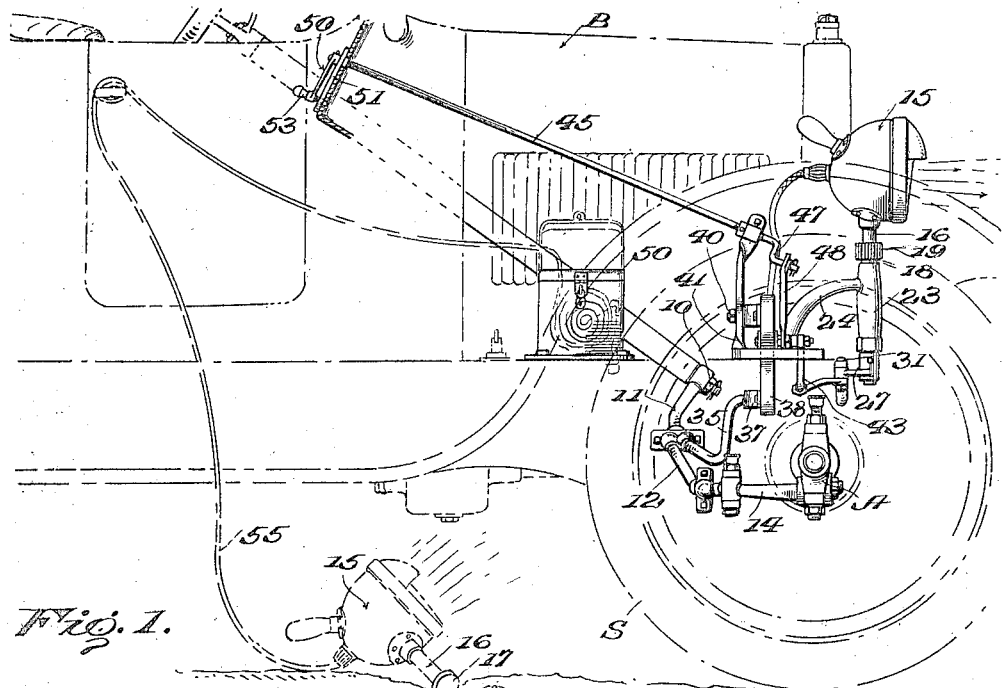
Figure 1 is a view in side elevation, showing the invention applied upon a vehicle, the vehicle being shown diagrammatically.
Figure 2:
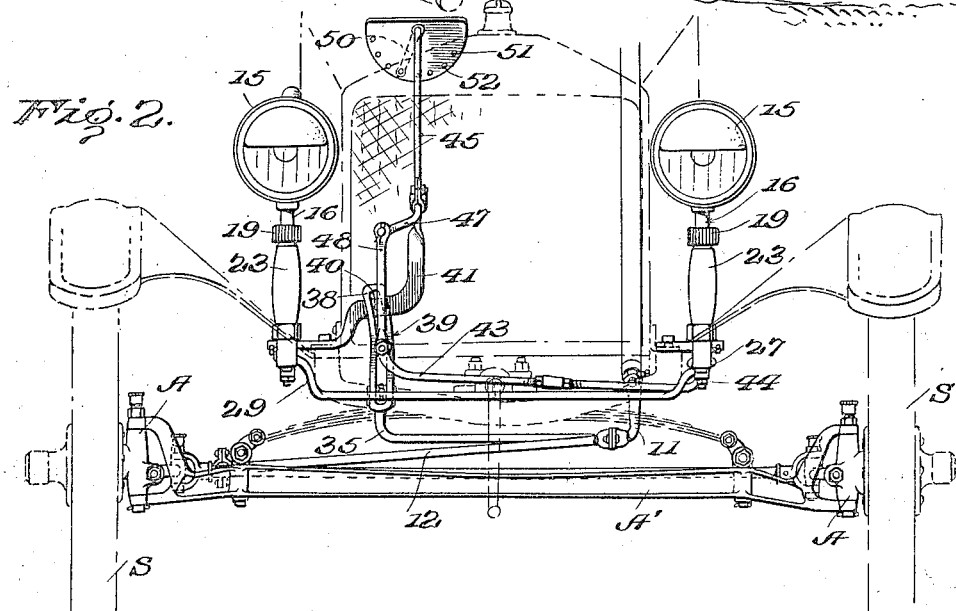
Figure 2 is a similar view in front elevation.

Referring to the drawings wherein for the sake of illustration is shown the preferred embodiment of the invention, the reference character B designates generally the vehicle which may be an automobile and which as usual includes a chassis or frame C and a front axle A which is preferably of the stub axle type. The steering wheels of the vehicle are mounted upon the stub axles in the usual manner and as designated at S, and these steering wheels are controlled by any type of conventional steering mechanism which preferably includes a steering post 10 having a steering arm 11 connected to the lower end thereof and controlling the steering wheels through suitable motion transmission mechanism such as a drag link 12 and tie bar 13, the tie bar 13 being connected to the steering arms 14 which are attached to the spindles of the stub axle assembly in the usual manner and the usual universal connection being provided between the ends of the drag link and tie bar 13. This steering mechanism per se constitutes no part of the present invention, and it is to be understood that any other conventional steering mechanism may be employed in lieu thereof but it does serve to control the headlights through the mechanism which will presently be described.

Headlights, designated at 15, are provided and as they are of identical construction, a common description will serve for both. Each headlight is connected to the upper end of a short vertical rod 16, the lower end of which is flanged or otherwise enlarged, as at 17 and rests upon the flat upper end of a short vertical shaft 18, the rod 16 being coupled to the shaft by a releasable coupling, designated generally at 19 and comprising an internally threaded sleeve 20, the internal threads of which are engaged with corresponding threads 21 formed on the upper end of the shaft 18, and an inwardly-extending annular flange 22 provided at the upper end of the sleeve 20 and engaging the flanged end 17 of the rod 16. In this manner the headlight is rigidly though releasably connected to the shaft 18. The shaft 18 is rotatably journaled in a bearing 23 carried by a bracket arm 24 which extends laterally from a bracket plate 25 fixed to the chassis or frame of the vehicle. As the shafts 18 are rotatably mounted, the headlights are also rotatably mounted. Vertical motion of the shafts 18 and consequently of the headlights is prevented by means of jam-nuts 26 threaded on the lower ends of the shafts 18 and engaging the lower ends of the bearings 23. A crank arm 27 is carried by each shaft 18 below the jam nut 26, and these crank arms have pivotally connected thereto a horizontally arranged bar, designated generally at 28, and including a body portion 29 and offset end portions 30 pivotally connected, as at 31, to the crank arms 27, the bar and crank arms thus serving to constrain the headlights 15 to corresponding motion.

An angle connecting bar 35 has one end secured to the steering arm 11 by means of any conventional universal connection indicated generally at 36, this universal connection 36 preferably being of the ball and socket type such as is utilized to connect the drag link of the universal steering mechanism to the steering arm thereof. The other end of the angle connecting bar 35 is fastened by means of a bracket 37 to a link frame 38 of a link mechanism, designated generally at 39, the link frame 38 being pivotally supported, as at 40 upon a bracket 41 carried by the main frame. A link block 42 is adjustably mounted in the link frame 38 and is pivotally connected to one end of an adjustable pitman 43, the other end of the pitman being pivotally connected, as at 44, to one of the crank arms 29. The pitman 43 is adjustable by means of a turn buckle 43ª incorporated therein. The link block 42 is controlled by means of the rotatable control shaft 45, journaled in the bearing 46 provided upon the bracket 41, and having a crank arm 47 connected to the link block 42 by means of a connecting rod 48, the connecting rod being pivotally connected to the link block and to the crank arm. At the end of the shaft 45 opposite the crank arm 47, an operating arm or handle 50 is provided and plays or operates across the face of a lock plate 51 secured to the dash, the lock plate 51 having a series of openings 52 in which a spring pressed lock pin carried by the arm 50 is adapted to be selectively disposed.

When the link block 42 is arranged in the lower end of the link frame 38 the headlights 15 are under the control of the steering mechanism for at such time when the steering arm 11 moves under the control of the operator its motion is taken by the angle connecting bar 35 which in turn swings the link frame 38 on its pivot 40. The link block 42 being disposed in the lower end of the link partakes of the swinging motion of the link and as the link block is connected to the crank arm 27 by the pitman 43 and crank arms 27 also partakes of the motion of the steering arm and through the crank arms 27 and shafts 18 turns the headlights 15. Depending upon the position of the link block in the link the entire motion of the steering arm or the reduced motion thereof is imparted to the headlights. If desired the link block may be raised in the frame 38 until its pivotal connection to the pitman 43 is horizontally alined with the pivot 40 of the link 38 and at such time the swinging motion of the link is not imparted to the link block or to the pitman 43. It is to be understood that the position of the link block is readily controlled by manipulating the handle 50.

One of the headlights 15 is adapted to be used as a spot-light, as shown in Figure 1, and for this purpose the electric cord or cable which runs thereto and which is designated at 55 is of sufficient length to permit of proper manipulation of the light. This cord or cable, when the light 15 is not in use as a spot-light may be conveniently coiled or stored in the container 56 provided therefor and located upon the frame or suitable portion of the vehicle. It is of course obvious that the headlight may be readily attached by unthreading the sleeve 20 from the shaft 18.

We claim:

In combination with the steering mechanism of a vehicle, a headlight, a shaft connected to said headlight and means coacting with the shaft and under the control of the steering mechanism for turning said headlights and including a pivoted link frame, a connecting rod between the steering mechanism and the link frame, a link block slidably mounted in said link frame, an adjustable pitman having one end pivotally connected to said link block and having its other end connected to said shaft, and manually operated adjusting mechanism for said link block including a control shaft having a crank connected with the link block and having a handle, a plate adjacent said handle and provided with a series of holes, and a spring pressed pin carried by the handle and selectively cooperable with said holes.

ROBERT LAWRENCE RICE, Sr.
WILLIAM MARTIN JORDAN, Jr.